No. 683,494. Patented Oct. 1, 1901.
H. C. PORTER.
BATTERY PLATE SEPARATOR.
(Application filed Feb. 5, 1900.)
(No Model.)
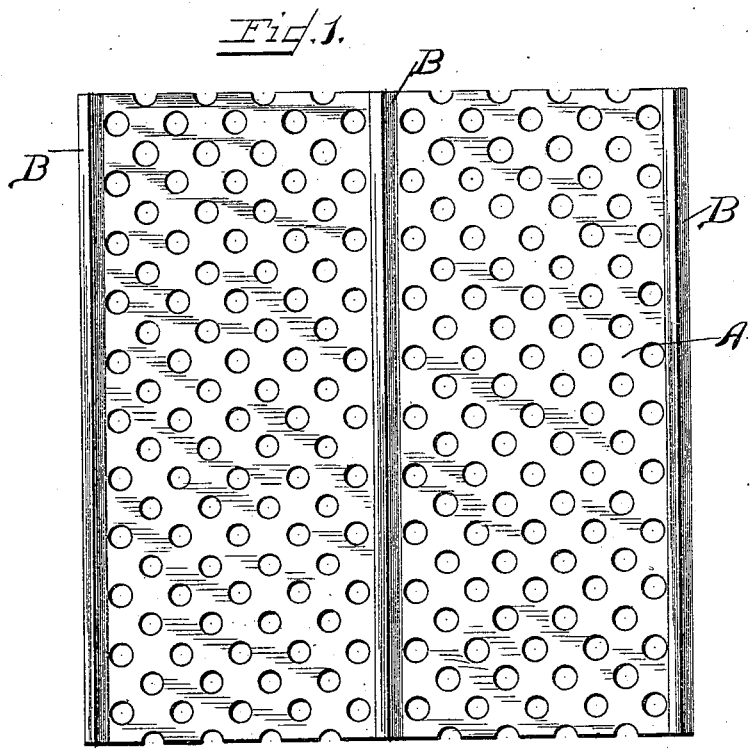
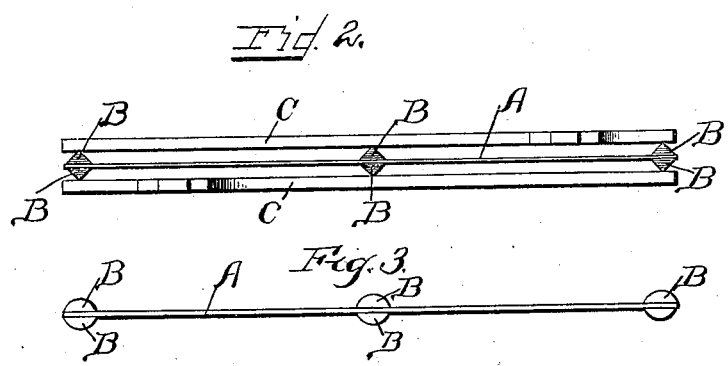

UNITED STATES PATENT OFFICE.

HENRY C. PORTER, OF CHICAGO, ILLINOIS, ASSIGNOR OF ONE-HALF TO THE OWEN H. FAY LIVERY COMPANY, OF SAME PLACE.

BATTERY-PLATE SEPARATOR.

SPECIFICATION forming part of Letters Patent No. 683,494, dated October 1, 1901.

Application filed February 5, 1900. Serial No. 4,103. (No model.)

*To all whom it may concern:*

Be it known that I, HENRY C. PORTER, a citizen of the United States, residing at 7606 Union avenue, Chicago, in the county of Cook and State of Illinois, have invented certain new and useful Improvements in Battery-Plate Separators, of which the following is a specification.

This invention relates to improvements in battery-plate separators intended for use in secondary batteries, and has for its primary object the production of a cheap and durable separator that shall prevent short-circuiting of the battery-plates or of the active material thereon, that shall permit free circulation of the electrolytic fluid in the battery, while at the same time serving to arrest the washing action thereof when the battery is used portably, and which shall also afford a permanent egress for the gases resulting from the action of the battery. These and such other objects as may hereinafter appear are attained by the devices illustrated in the accompanying drawings, in which—

Figure 1 represents a side elevation of a separator embodying my invention. Fig. 2 represents a plan view thereof, showing battery-plates on opposite sides of the separator; and Fig. 3 is a detail view of the separator in slightly-modified form.

Similar letters of reference indicate the same parts in the several figures of the drawings.

Referring by letter to the accompanying drawings, A indicates a perforated sheet of hard rubber, celluloid, or like insulating material of any suitable shape and dimensions, and B vertical strips or bars of hard rubber, celluloid, or like material cemented or otherwise rigidly secured to the plate A at the side edges thereof and preferably at one or more points intermediate between the side edges, the drawings showing the strip as centrally located. It will be understood that the strips B are located on opposite sides of the plate A, coincident with each other, so that when the separator is placed between a pair of plates of a storage battery, such as those represented at C in Fig. 2, the battery-plates will be not only separated from each other, but separated from the plate A.

The configuration of the strips or bars B in cross-section is immaterial, although it is of course desirable to reduce the contacting surface thereof with the battery-plates to the minimum, to which end the most desirable forms I have found to be the triangular shape shown in Fig. 2 or the semicircular shape shown in Fig. 3. These bars are very cheap to produce, those shown in Fig. 2 being formed from square bars cut diagonally, while those shown in Fig. 3 are formed from circular bars cut in half, both of these bars being common articles of manufacture both in celluloid and in hard rubber, and by the use thereof in connection with the perforated hard-rubber or celluloid sheet A, I am enabled to provide a thoroughly efficient separator and at the same time one that costs less than one-fifth as much as any separator now known to me upon the market.

The plate A must be perforated in order to permit a free circulation of the electrolytic fluid; but it interposes sufficient obstruction to prevent the washing of the fluid back and forth against the plates when the battery is portably mounted, as in use upon a motor-vehicle. Therefore the bars B not only serve to strengthen and stiffen the plates A, but also cover the minimum surface upon the battery-plates, thus exposing the maximum quantity of the usual active material to the electrolytic fluid, while materially assisting in holding the active material on the battery-plates, and at the same time by holding the battery-plates C properly separated from each other they form vertical channels between said plates, through which the gases resulting from the action of the battery are free to escape. This last-mentioned feature is of well-recognized importance in storage batteries, because if the gases which form during the use of a battery are not permitted free escape from the electrolytic fluid they will form bubbles upon the plates of the battery, and thereby create internal resistance, lessen the surface of active material exposed to the electrolytic fluid, and correspondingly reduce the efficiency of the battery, as well as the discharge therefrom. Hence it is especially desirable in the use of separators that, while the battery-plates shall be held separate from one another and the active material shall be thereby held upon the battery-plates as far as is consistent with a maximum exposure thereof to the action of the electrolytic fluid, the fluid should have free circulation in the battery, but be restrained from a washing action that would tend to dislodge the active material from the battery-plates, while the gases formed by the action of the battery shall be afforded ready egress from the electrolytic fluid at all times.

Economy in the construction of these separators is also of great importance in the construction of storage batteries, because of the large number of plates necessarily employed and the resultant weight and expense following the use of separators. Therefore it will be readily seen that a separator that is efficient and that can be manufactured for less than a fifth of any separator now on the market would give a manufacturer commercial advantages of paramount importance when in competition with batteries of the same kind and class and especially where they are intended for motor-vehicles.

Having thus fully described my invention, what I claim, and desire to secure by Letters Patent, is—

As a new article of manufacture, a separator for battery-plates composed of a flat perforated sheet of insulating material and a plurality of vertical bars also composed of insulating material, and secured coincident with each other both to the outer edges of said perforated sheet and intermediate of the outer edges on opposite sides of the sheet, said sheet being centrally located between the battery-plates to form unobstructed vertical channels between said battery-plates.

HENRY C. PORTER.

Witnesses:
C. L. WOOD,
F. H. DRURY.